March 22, 1927.
T. J. STURTEVANT
SEPARATOR
Filed June 29, 1925
1,621,564
3 Sheets-Sheet 1
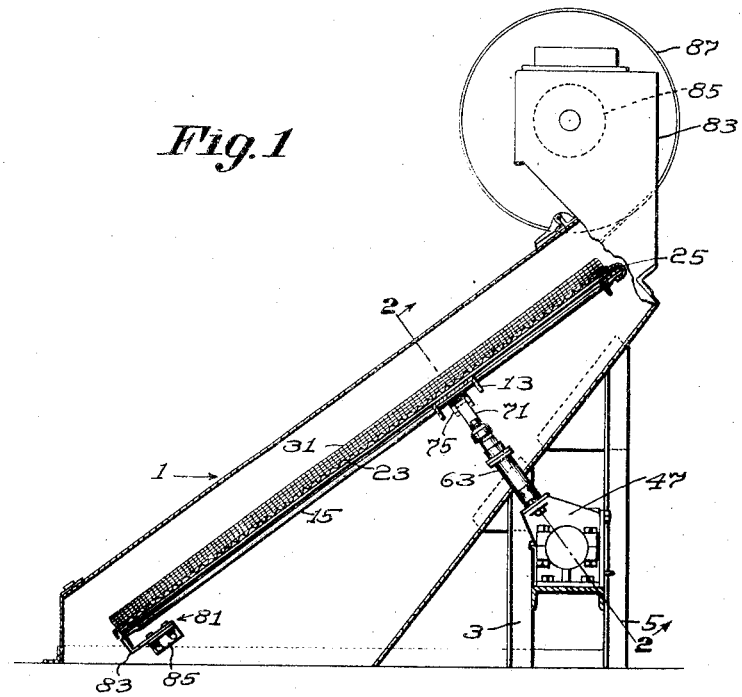
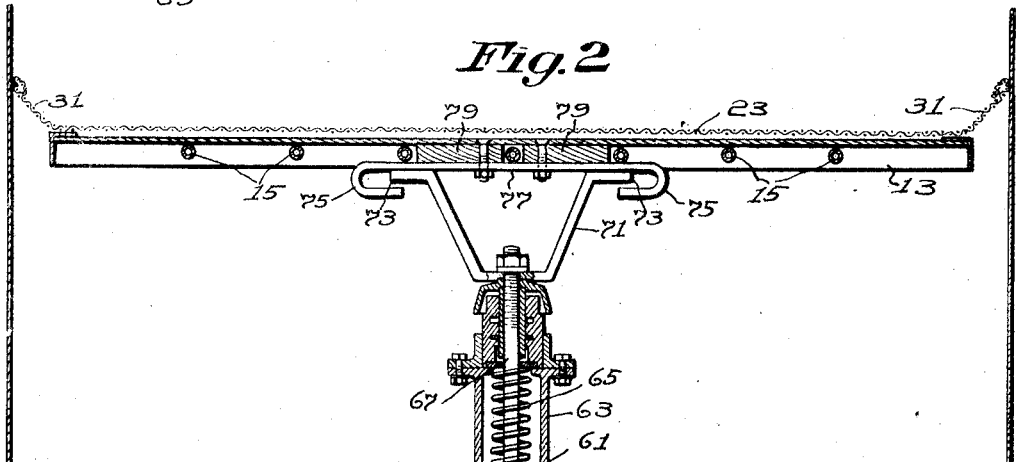
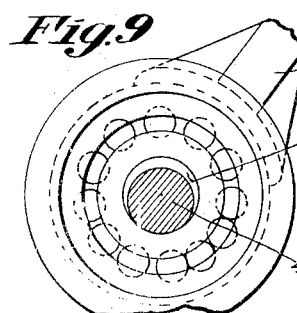
INVENTOR:
Thomas J. Sturtevant
BY Henry T. Williams,
ATTORNEY March 22, 1927.
T. J. STURTEVANT
SEPARATOR
Filed June 29, 1925
1,621,564
3 Sheets-Sheet 2
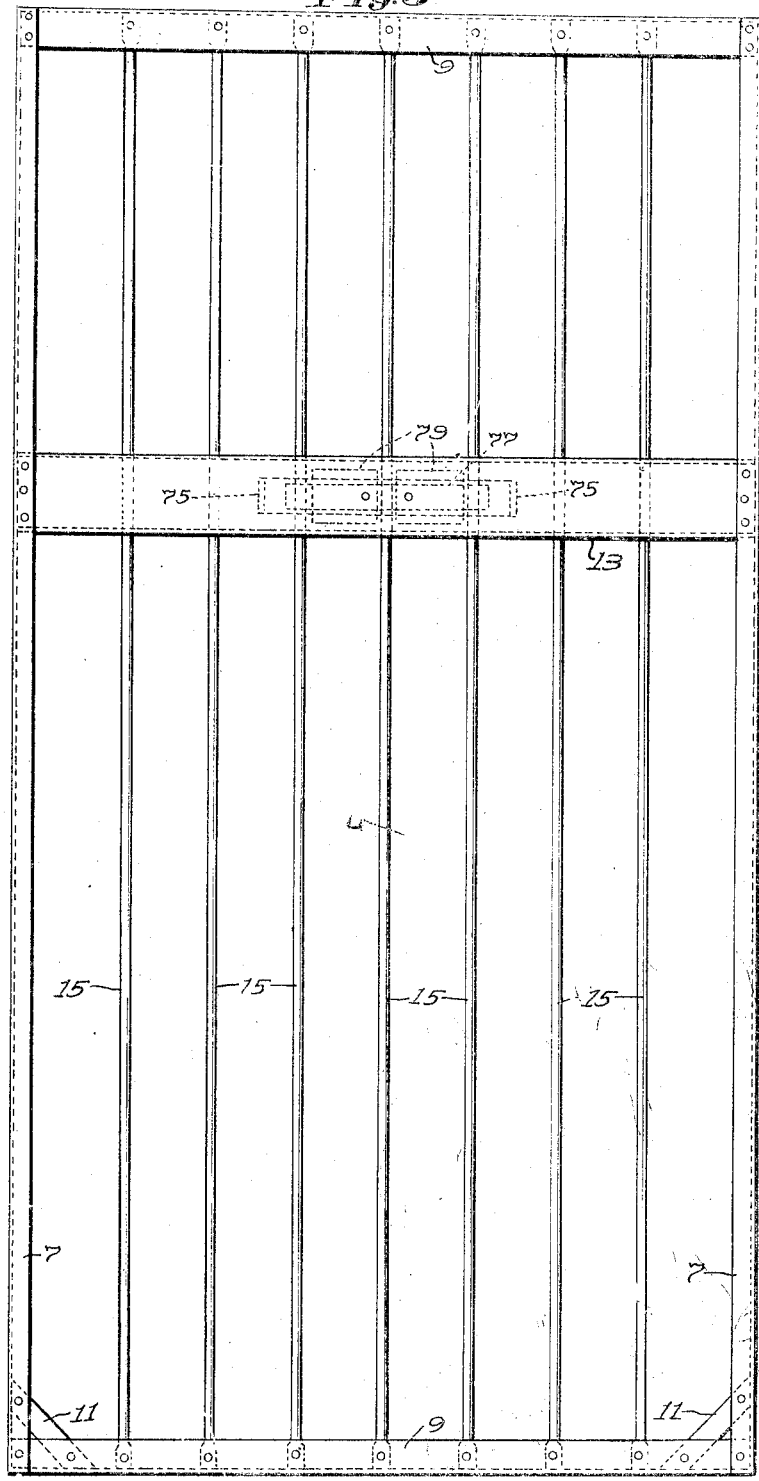
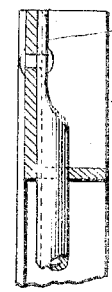
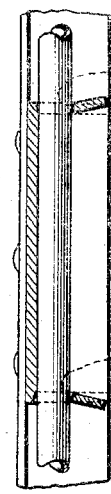
INVENTOR:
Thomas J. Sturtevant
BY Henry T. Williams
ATTORNEY March 22, 1927.
T. J. STURTEVANT
SEPARATOR
Filed June 29, 1925 3 Sheets-Sheet 3
1,621,564
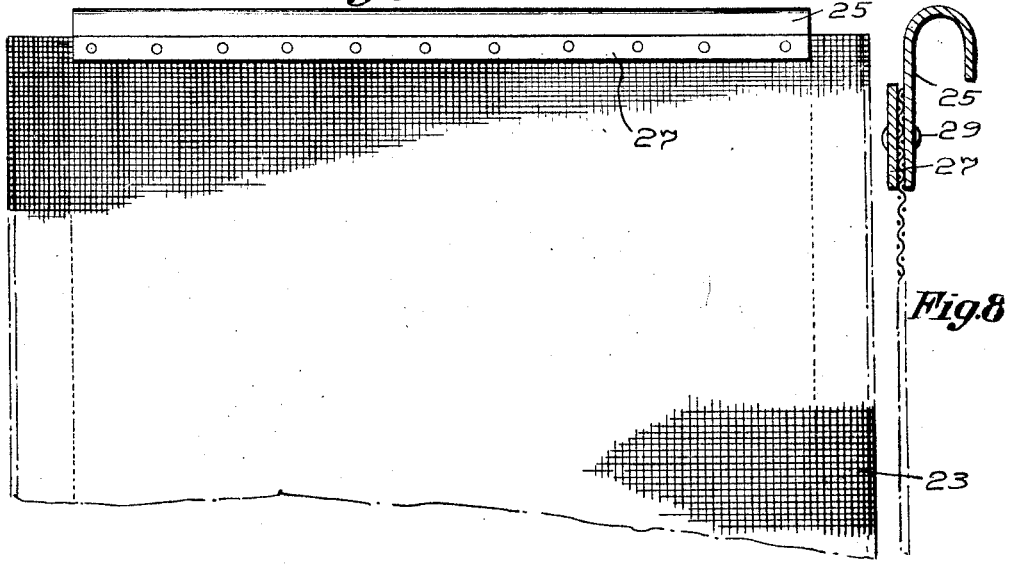
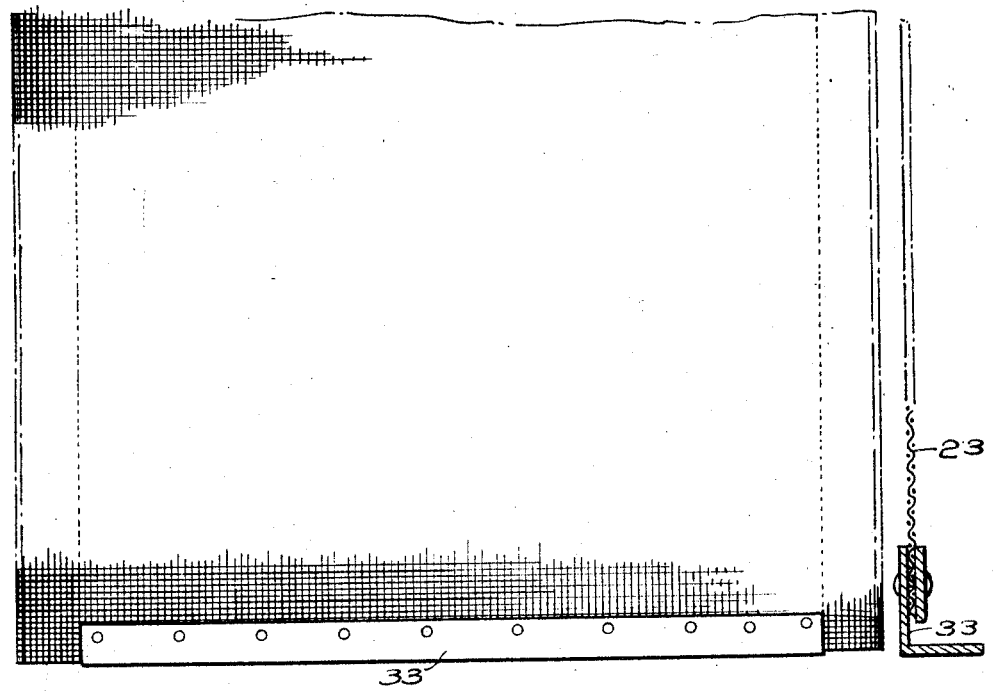
INVENTOR:
Thomas J. Sturtevant
BY Henry T. Williams
ATTORNEY Patented Mar. 22, 1927.

1,621,564

UNITED STATES PATENT OFFICE.

THOMAS J. STURTEVANT, OF WELLESLEY, MASSACHUSETTS, ASSIGNOR TO STURTEVANT MILL COMPANY, OF BOSTON, MASSACHUSETTS, A CORPORATION OF MASSACHUSETTS.

SEPARATOR.

Application filed June 29, 1925. Serial No. 40,263.

The invention to be hereinafter described relates to separators for grading materials.

The usual separator has a screen comprising wire mesh screen clothing stretched on and secured to a frame. When the screen is vibrated, the screen clothing flexes rapidly up and down, and the constant bending back and forth of the wires at the juncture of the clothing with the frame eventually causes the wires to become crystalized and ruptured, thereby making it necessary to provide new screen clothing.

One of the purposes of the present invention is to provide a screen having screen clothing in unframed and unstretched condition. This screen rests upon a suitable support, in the present instance, comprising a frame having rods disposed at intervals between the sides of the frame and secured to the ends of the frame, the spacing of the rods being such that the clothing is prevented from sagging between the rods.

The screen supporting frame may be vibrated by mechanism similar in certain respects to that disclosed in Letters Patent No. 1,499,892, granted in my name July 1, 1924. This mechanism vibrates the frame and the screen clothing thereon, and the meshes of the latter are kept in open condition for efficient grading effect. Since the screen clothing is not stretched and the margins thereof are not secured to a frame, the flexion of the screen clothing at its juncture with a frame is avoided, the life of the screen clothing is desirably prolonged, and vibration of the screen clothing is desirably distributed throughout the area thereof.

The character of the invention may be best understood by reference to the following description of one good form thereof shown in the accompanying drawings, wherein:

Fig. 1 is a vertical longitudinal section through a separator embodying the invention;

Fig. 2 on an enlarged scale is a transverse section taken on line 2—2 of Fig. 1;

Fig. 3 on an enlarged scale is a plan of the frame for supporting the screen;

Figs. 4, 5 and 6 are longitudinal sections through portions of the frame shown in Fig. 3;

Fig. 7 is a plan of the screen;

Fig. 8 is a longitudinal section through the screen; and

Fig. 9 on an enlarged scale is a vertical section through a portion of the eccentric mechanism.

Referring to the drawings, the separator shown therein comprises a casing 1 supported in inclined position by uprights 3 and 5.

The screen support, in the present instance, is in the form of a frame comprising a pair of side angle bars 7 and end angle bars 9 riveted to the side bars. At one end of the frame are inclined braces 11 riveted to the side and end bars. A transverse member, in the present instance, in the form of a channel 13 extends across the frame and is riveted to the side bars at a substantial distance from the upper end of the screen. Supporting elements, in the present instance, in the form of tubular rods 15 are disposed at intervals in the space between the side bars, and the ends 17 of the tubular rods are flattened and riveted to the end bars of the frame, as will be noted in Figs. 4 and 6. These rods extend through registering holes 19 in the flanges of the channel 13, and are close to the under face of the back of the channel. To prevent any play of the rods in the holes in the channel flanges, the outer portions 21 of said flanges may be bent somewhat, as will be noted in Fig. 5, thereby to cause the outer portions of the flanges to bite into the rods, and prevent any play of the rods in the holes.

The screen comprises wire mesh screen clothing 23 (Figs. 2, 7 and 8) of appropriate size to cover the screen supporting frame. Extending along the upper edge of the screen clothing is a hook 25 (Fig. 8) and opposed to it is a metal strip 27. The upper margin of the screen clothing is interposed between the hook and strip, which are secured together by rivets 29.

To prevent the materials being graded from flowing over the side edges of the screen clothing, the margins 31 of opposed sides of the clothing may be bent upwardly and outwardly, and the edges of said margins may be turned over to avoid ragged edges. The margins thus bent also serve as straightening members to prevent longitudinal curling of the screen clothing. An angle strip 33 is secured to the lower edge of the screen clothing and serves to prevent transverse curling of the screen clothing.

The screen rests upon the supporting frame with the hook 25 engaging the upper end bar 9 of the frame. The screen clothing hangs freely down from the hook in unstretched condition and rests upon and receives desirably distributed support from the rods 15.

The means for vibrating the frame and the screen clothing thereon, in the present instance, comprises an eccentric 41 (Fig. 2) of minute eccentricity, said eccentric being formed on a shaft 43 journalled in ball bearings 45 in a casing 47. Said shaft may be driven by any suitable source of power.

Encircling the eccentric are rings 49 and 51 having raceways receiving balls 53 constituting ball bearings which are enclosed in a box 55 through which the shaft extends. The box is formed to provide a circumferential groove 57 receiving a follower 59 on the lower end of a rod 61 which extends upwardly through a tubular housing 63 mounted on the casing 47. The follower is pressed toward the box groove 57 by a coil spring 65 confined between an internal flange 67 on the housing 63 and a collar 69 fast on the rod 61.

Secured to the upper end of the rod 61 is a U-shaped head or hammer 71 having feet 73 entered into impact means, in the present instance in the form of hooks 75 at the ends of a plate 77 secured by rivets to the back of the frame channel 13 referred to, suitable spacing blocks 79 being interposed between the plate 77 and the back of the channel.

The lower end of the screen supporting frame rests upon a pair of brackets 81, each comprising a hook 83 of resilient material riveted to a flange of an angle plate 85, the other flange of which is riveted to the side of the casing. The lower end bar of the frame is received by the hooks, and the resilience of the latter is sufficient to allow movements of the lower end of the frame. The upper portion of the frame rests upon and is supported by the U-shaped hammer of the eccentric vibrating mechanism. Thus it will be observed that the screen has a three-point support comprising the brackets 81 and the hammer. The feet of the latter have sufficient spread to prevent lateral rocking of the frame.

The eccentric is rotated at high speed, such, for example, as 1800 r. p. m., and reciprocates the rod longitudinally thereby causing the feet of the hammer to vibrate in the plate hooks 75, and impart minute blows to said hooks in opposite directions. The spaces between the hammer feet and the faces of the hooks engaged thereby, are each slightly greater than the minute stroke of the hammer.

The hooks 75 are of resilient material, and the vibrations imparted to said hooks by the hammer are transmitted to the frame channel 13 and from the latter to the frame and the tubular rods extending through the channel and connected to the end members of the frame. The whole structure of the frame is in a highly vibrant condition, and the vibration is imparted to the screen which rests upon the frame. Preferably the hook 25 at the upper end of the screen is sufficiently large to allow play of the hook relatively to the upper end bar of the frame, and thus the upper edge of the screen is loosely connected to the frame. Since the screen is not secured to the frame, the whole body of the screen clothing may vibrate relatively to the frame, and the screen clothing and the rods may rap against each other so as to keep the meshes of the screen clothing in open condition. Since the screen clothing does not have a frame, the destructive flexion which has heretofore occurred at the lines of juncture of the margins of the screen clothing with the frame is eliminated, and the life of the screen clothing is prolonged.

An important feature of the invention is the vibrator hammer and the frame hook plate cooperating with the feet of the hammer. Since the hammer feet are disposed within the hooks, they limit the upward movement of the frame and hold the latter down so as to receive the rapid succession of blows from the hammer. If means were not provided for thus holding the frame down to the hammer, only a portion of the rapid hammer blows would be imparted to the frame due to the fact that the frame would drop under the influence of gravity, and its movement thus occasioned would be far slower than the movements of the hammer.

Another desirable feature of the hook cooperating with the hammer is that it may be applied to the under side of the screen supporting frame where it occupies little space and does not interfere with the flow of materials down along the screen.

The screen may be quickly and easily removed from its supporting frame. To accomplish this, it is merely necessary to unhook the upper end of the screen from the frame and lift the screen therefrom. The screen may be mounted upon the frame with equal ease.

The screen supporting frame may be quickly and easily removed from the casing. To accomplish this the frame is moved up slightly to shift the hooks 75 out of alignment with the hammer feet. Then the frame can be readily lifted off from the brackets and out of the casing. The hammer and hooks are so constructed that the screen supporting frame and the hammer are detachably connected and with sufficient looseness to allow play of the hammer in imparting its blows to the screen.

Any suitable means may be provided to deliver the materials to be graded to the upper end of the casing, such, for example, as the box 83 (Fig. 1) containing a screw conveyer 85 of usual construction mounted on a shaft provided with a pulley 87 which may be driven from any suitable source of power.

It will be understood that the invention is not limited to the specific embodiment shown, and that various deviations may be made therefrom without departing from the spirit and scope of the appended claims.

What is claimed is:

1. In a separator for grading materials, the combination of a frame having side bars, end bars connected to the side bars, and rods disposed at intervals in the space between the side bars and secured to the end bars, substantially flat screen clothing resting upon said rods without being stretched or secured to said frame, and means for vibrating said frame and screen clothing.

2. In a separator for grading materials, the combination of a frame having side bars and end bars, and supporting elements disposed at intervals in the space within the frame and secured to the frame, and screen clothing resting upon said supporting elements in unstretched condition and means operating through said frame for vibrating said screen clothing.

3. In a separator for grading materials, the combination of a frame, supporting elements disposed at intervals in the space within and secured to the frame, and screen clothing resting upon said supporting elements in unstretched condition and having merely one edge thereof connected to the frame, the body of the screen clothing being free to vibrate relatively to said frame and supporting elements.

4. In a separator for grading materials, the combination of a frame, supporting elements disposed at intervals in the space within the frame and secured to said frame, and screen clothing resting upon said supporting elements in unstretched condition and provided with means detachably to connect one edge of the clothing to said frame.

5. In a separator for grading materials, the combination of a frame having supporting elements disposed at intervals in the space within the frame and secured to the frame, means to support the frame in inclined position, substantially flat screen clothing resting upon said supporting elements in unstretched condition, and means to connect the upper edge of the screen clothing to the upper end of the frame, that the body of the screen clothing may hang freely from said supporting means down over said supporting elements.

6. In a separator for grading materials, the combination of a support, screen clothing resting upon said support in unstretched condition, one of the edges of the screen clothing being connected to the support, and the other edges of the screen clothing being free from connection with said support, and reciprocating means operating through said support and for vibrating screen clothing.

7. In a separator for grading materials, the combination of a frame having side bars and end bars, supporting elements disposed at intervals between the side bars and secured to the end bars, substantially flat screen clothing resting freely upon said supporting elements in unstretched condition, and a hook secured to one edge of the screen clothing and adapted to connect the same with one of the end bars of the frame.

8. In a separator for grading materials, the combination of a frame having side bars and end bars, a transverse bar extending across the frame and secured to the side bars, rods disposed at intervals between the side bars and secured to the end bars, screen clothing resting in unstretched condition upon said rods, and means operating through the transverse bar to vibrate the frame, rods and the screen clothing thereon.

9. In a separator for grading materials, the combination of a frame having side bars, end bars, a channel secured to the side bars and having holes in the flanges of the channel and rods entered through the holes in the channel and having the ends thereof secured to the end bars of the frame, and unstretched screen clothing resting freely upon said rods.

10. In a separator for grading materials, the combination of a frame having side bars, end bars and tubular rods disposed at intervals between the side bars and secured to the end bars, means to support said frame in inclined position, and screen clothing resting upon said rods and provided with means for connecting the upper edge of the screen clothing with the upper end of the frame, that the body of the screen clothing may hang freely down upon said rods.

11. In a separator for grading materials, the combination of a frame, supporting elements disposed at intervals within the frame and secured thereto, said frame being adapted to be supported in inclined position, screen clothing resting freely upon said supporting elements in unstretched condition and detachably connected to the frame, and vibrating mechanism beneath the frame and contributing to the support thereof.

12. In a separator for grading materials, the combination of a frame having side bars, end bars, and a transverse bar secured to the side bars, unframed screen clothing resting freely upon said frame, and vibrating mechanism including an eccentric of minute eccentricity, and means extending from the eccentric to the transverse bar of the frame for imparting vibration from the eccentric to the frame.

13. In a separator for grading materials, the combination of a frame, supporting elements disposed at intervals in the space within the frame and secured to the frame, unframed screen clothing resting upon said supporting elements and having one edge loosely connected to the frame, and vibrating mechanism having provision for reciprocating said frame.

14. In a separator for grading materials, the combination of a frame having a member crossing the same and secured thereto, unframed screen clothing resting upon said frame in unstretched condition, and vibrating mechanism having provision for imparting minute blows to said frame member in opposite directions.

15. In a separator for grading materials, the combination of a frame having side bars, end bars, and rods disposed at intervals between the side bars and secured to the end bars, and unframed screen clothing resting upon said rods and having merely one edge of the clothing connected to one of the end bars of the frame, said clothing having upstanding members for preventing materials from escaping over the side edges of the clothing.

16. In a separator for grading materials, the combination of a frame having side bars, end bars, and tubular rods disposed at intervals between the side bars and having flattened ends secured to the end bars, screen clothing resting on said rods in unframed and unstretched condition, and means connecting one edge of the screen clothing with one of the end bars of the frame.

17. In a separator for grading materials, the combination of a support, and screen clothing resting upon said support in unframed, unstretched condition, said clothing being provided with members at opposite ends thereof for preventing curling of the clothing transversely to the lengths of said members.

18. In a separator for grading materials, the combination of a screen and means for vibrating the screen comprising an eccentric, a rod extending transversely to the plane of the screen and longitudinally reciprocated by said eccentric, a pair of hooks secured to the screen, and a hammer on the end of the rod having a pair of feet entered into said hooks and adapted to impart blows in opposite directions to said hooks on the longitudinal reciprocation of said rod.

19. In a separator for grading materials, the combination of a frame, screen clothing carried by the frame, and means for automatically vibrating the frame and the screen clothing comprising an impact member secured to the under side of the frame, an eccentric beneath the frame, a rod extending up toward the frame and longitudinally reciprocated by the eccentric, and a hammer on the rod adapted to impart blows to the impact member, said eccentric, rod and hammer being arranged to operate through the impact member to furnish support for the screen frame, and said impact member and hammer being formed and arranged so that the hammer will strike the impact member in both directions of reciprocation of the rod and hammer.

20. In a separator for grading materials, the combination of a frame, screen clothing carried by the frame, and means for automatically vibrating the frame and the screen clothing comprising an impact member secured to the under side of the frame, an eccentric beneath the frame, a rod extending up from the eccentric toward the frame, and a hammer on the rod adapted to impart blows to the impact member, said eccentric, rod and hammer being arranged to operate through the impact member to furnish support for the frame, and said impact member and hammer being formed and arranged to limit upward movement of the frame away from the hammer.

THOMAS J. STURTEVANT.